United States Patent
Nakamura et al.

(10) Patent No.: US 8,195,985 B2
(45) Date of Patent: Jun. 5, 2012

(54) NETWORK MONITOR AND CONTROL APPARATUS

(75) Inventors: Hiroshi Nakamura, Fukuoka (JP);
Hideki Matsuda, Fukuoka (JP);
Fumiaki Akazawa, Fukuoka (JP);
Makoto Shiraga, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/718,074

(22) Filed: Mar. 5, 2010

(65) Prior Publication Data
US 2010/0241907 A1 Sep. 23, 2010

(30) Foreign Application Priority Data
Mar. 19, 2009 (JP) .................. 2009-068110

(51) Int. Cl.
*G06F 11/00* (2006.01)
(52) U.S. Cl. ............ 714/47.1; 714/43; 714/45; 714/48; 714/56
(58) Field of Classification Search .............. 714/43, 714/45, 47.1, 48, 56
See application file for complete search history.

(56) References Cited

U.S. PATENT DOCUMENTS

| | | | |
|---|---|---|---|
| 5,276,440 A * | 1/1994 | Jolissaint et al. ............... 714/25 |
| 6,145,098 A * | 11/2000 | Nouri et al. ...................... 714/31 |
| 6,618,823 B1 * | 9/2003 | West .............................. 714/25 |
| 6,631,409 B1 * | 10/2003 | Watson et al. ................ 709/224 |
| 6,925,586 B1 * | 8/2005 | Perrella et al. .................. 714/57 |
| 7,082,554 B2 * | 7/2006 | Wilson et al. .................. 714/43 |
| 7,246,159 B2 * | 7/2007 | Aggarwal et al. ............. 709/220 |
| 7,418,634 B2 * | 8/2008 | Okuhara et al. ................ 714/44 |
| 7,475,299 B1 * | 1/2009 | Brenes et al. ................. 714/704 |
| 7,496,950 B2 * | 2/2009 | Carley ............................ 726/3 |
| 7,523,357 B2 * | 4/2009 | Irby et al. ..................... 714/47.2 |
| 7,673,035 B2 * | 3/2010 | Stevenson et al. ............. 709/224 |
| 7,760,859 B2 * | 7/2010 | Matityahu et al. .......... 379/22.06 |
| 7,903,541 B2 * | 3/2011 | Nguyen et al. ................ 370/216 |
| 2002/0045951 A1 | 4/2002 | Maesaka et al. |
| 2003/0028829 A1 * | 2/2003 | Slater et al. ..................... 714/47 |
| 2004/0168100 A1 * | 8/2004 | Thottan et al. .................... 714/4 |
| 2007/0028148 A1 * | 2/2007 | Kulidjian et al. ................ 714/47 |
| 2007/0088682 A1 * | 4/2007 | Kitamura .......................... 707/3 |
| 2009/0183023 A1 * | 7/2009 | Rathunde et al. ................. 714/4 |
| 2009/0288165 A1 * | 11/2009 | Qiu et al. ......................... 726/23 |

FOREIGN PATENT DOCUMENTS

JP 2002-123418 4/2002

* cited by examiner

*Primary Examiner* — Robert Beausoliel, Jr.
*Assistant Examiner* — Joshua P Lottich
(74) *Attorney, Agent, or Firm* — Staas & Halsey LLP

(57) ABSTRACT

A network monitor and control apparatus for controlling the monitoring of a network are provided. The network monitor includes an error monitor including an error information gatherer for gathering error information of a monitor target apparatus; and a monitor result notifier for notifying of monitor results, wherein if there are N types of monitor target functions, the error monitor includes N error information gatherers for the respective N types of monitor target functions (N=1, 2, 3, . . . ) and wherein each of the N error information gatherers gathers the error information from one of an existing monitor target apparatus and a newly added monitor target apparatus on a per monitor target function basis.

2 Claims, 19 Drawing Sheets

FIG.12

| APPARATUS TYPE ID | SysOID | APPARATUS TYPE NAME |
|---|---|---|
| 12001 | 1.3.6.101 | SWITCH OF COMPANY A |
| 12002 | 1.3.6.102 | ROUTER OF COMPANY A |

29

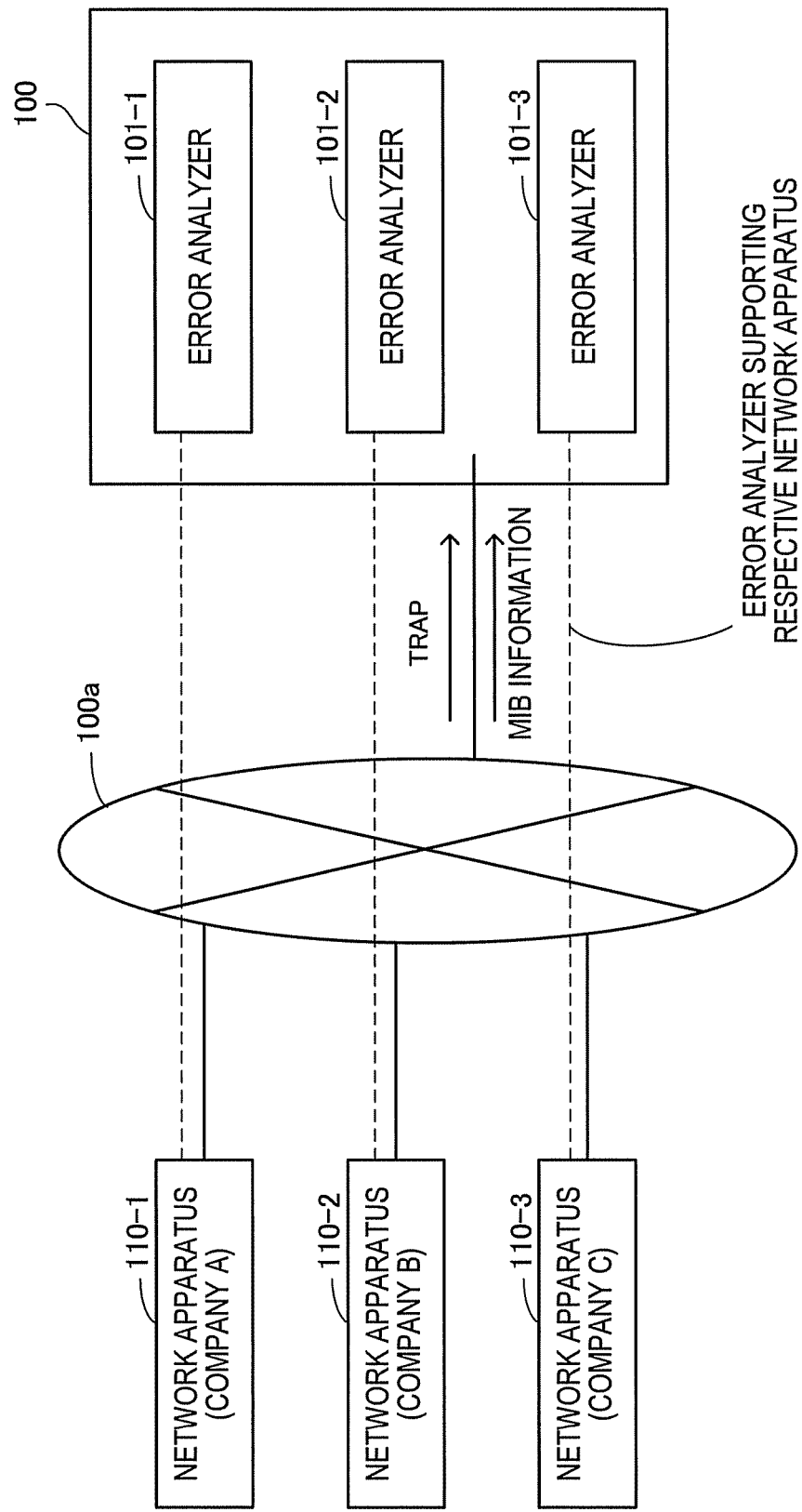

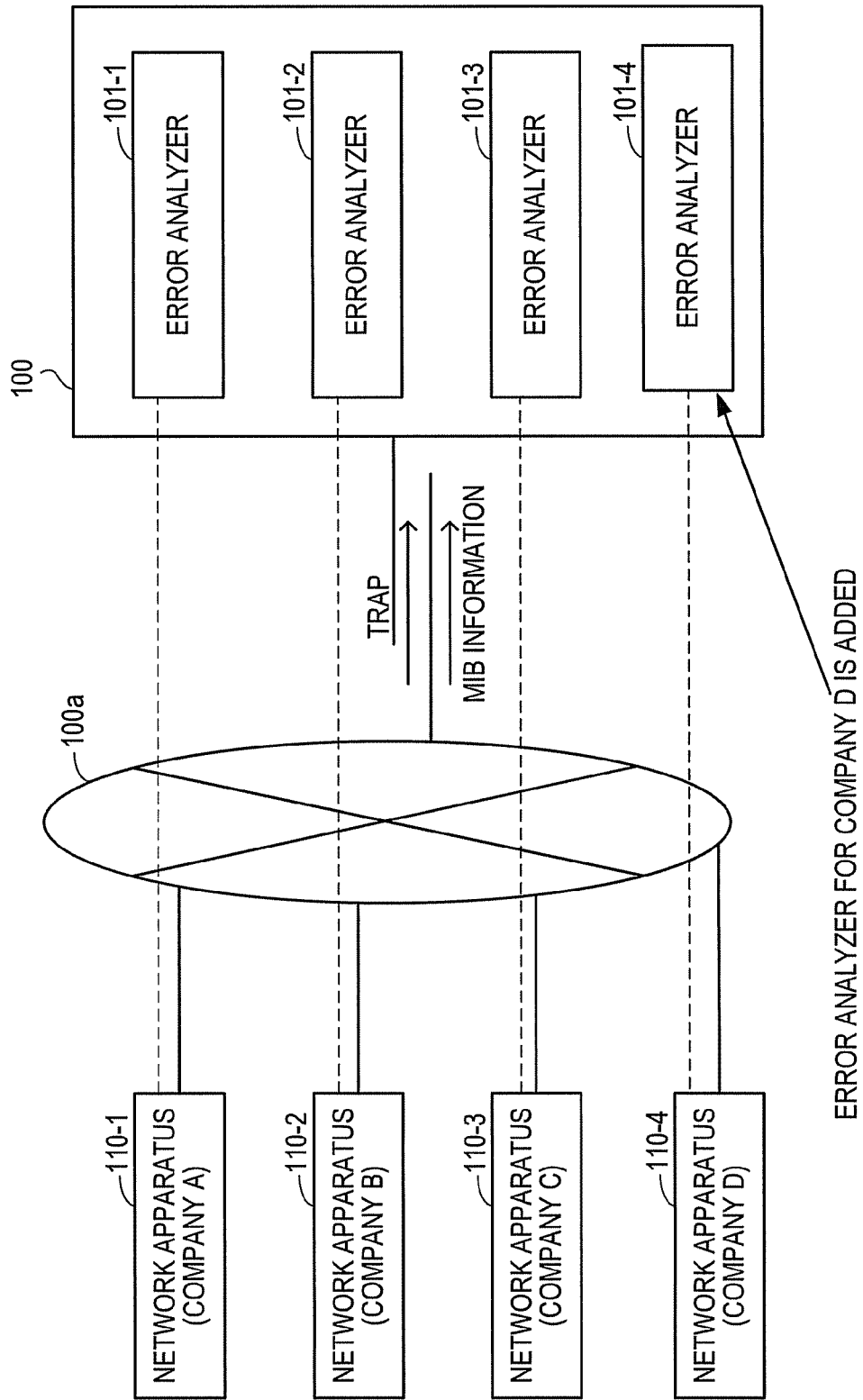

NETWORK MONITOR AND CONTROL APPARATUS

CROSS-REFERENCE TO RELATED APPLICATIONS

This application is related to and claims priority to Japanese Patent Application No. 2009-068110, filed on Mar. 19, 2009, and incorporated herein by reference.

BACKGROUND

1. Field

The embodiments discussed herein are directed to a network monitor and control apparatus.

2. Description of the Related Art

The importance of automatic monitoring techniques such as the simple network management protocol (SNMP) is increasing as the network technique advances and the diversity of network service multiplies.

An increasing number of new types of apparatuses have been introduced as network apparatuses. It is desirable that the new network apparatus be introduced for within a short period of time and at a low cost. During the introduction of the new type of apparatus, efficient network monitor control is preferably performed so that the newly introduced apparatus becomes operable with an existing system for within a short period of time.

FIG. 18 illustrates a network monitor and control configuration. A network monitor and control apparatus 100 is connected to network apparatuses 110-1 through 110-3 as target apparatuses for network monitoring via a relay network 100a. The network monitor and control apparatus 100 includes error analyzers 101-1 through 101-3 for respective target apparatuses for network monitoring.

The error analyzers 101-1 through 101-3 have error analysis functions respectively for the network apparatuses 110-1 through 110-3 for respective companies. More specifically, the error analyzer 101-1 analyzes only the network apparatus 110-1 for error for a company A, the error analyzer 101-2 analyzes only the network apparatus 110-2 for error for a company B, and the error analyzer 101-3 analyzes only the network apparatus 110-3 for error for a company C.

In a method of an error analysis, the error analyzers 101-1 through 101-3 receive traps transmitted from the network apparatuses 110-1 through 110-3, and analyze the contents of the traps in order to identify a network apparatus and the content of each error. The error analyzers 101-1 through 101-3 thus detect an error.

If each of the network apparatuses 110-1 through 110-3 detects a change in an operational status thereof (i.e., a change in management information base (MIB) information), error notification information called a trap is autonomously transmitted to the network monitor and control apparatus 100 in order to notify of the error.

In another method, periodically or in response to a trap received from one of the network apparatuses 110-1 through 110-3, the error analyzers 101-1 through 101-3 gather the MIB information from the respective apparatuses, and identify the error content from the gathered MIB information for error monitoring.

The network apparatus stores the management information thereof, and the management information is referred to as the MIB information. For example, the MIB information may include information related to a status of input and output ports, a power source status, and a loop error caused by spanning tree protocol (STP).

[The MIB information is managed by a unit called object. Each object is assigned an identifier called object identification (OID). An error analyzer may request the network apparatus to acquire predetermined MIB information and to modify setting the MIB information by designating the OID.

Japanese Unexamined Patent Application Publication No. 2002-123418 discloses a technique of updating data stored on a server in an update form of a client connected to a network.

SUMMARY

It is an aspect of the embodiments discussed herein to provide a network monitor and control apparatus for controlling the monitoring of a network. The above aspects can be attained by a system that includes an error monitor including an error information gatherer for gathering error information of a monitor target apparatus-, and a monitor result notifier for notifying of monitor results, wherein if there are N types of monitor target functions, the error monitor includes N error information gatherers for the respective N types of monitor target functions (N=1, 2, 3, . . . ) and wherein each of the N error information gatherers gathers the error information from one of an existing monitor target apparatus and a newly added monitor target apparatus on a per monitor target function basis.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 12 illustrates an exemplary network monitor and control apparatus.

FIG. 18 illustrates a network monitor control configuration.

FIG. 19 illustrates a system configuration with a network apparatus newly introduced.

DETAILED DESCRIPTION OF EMBODIMENTS

Figure 1:
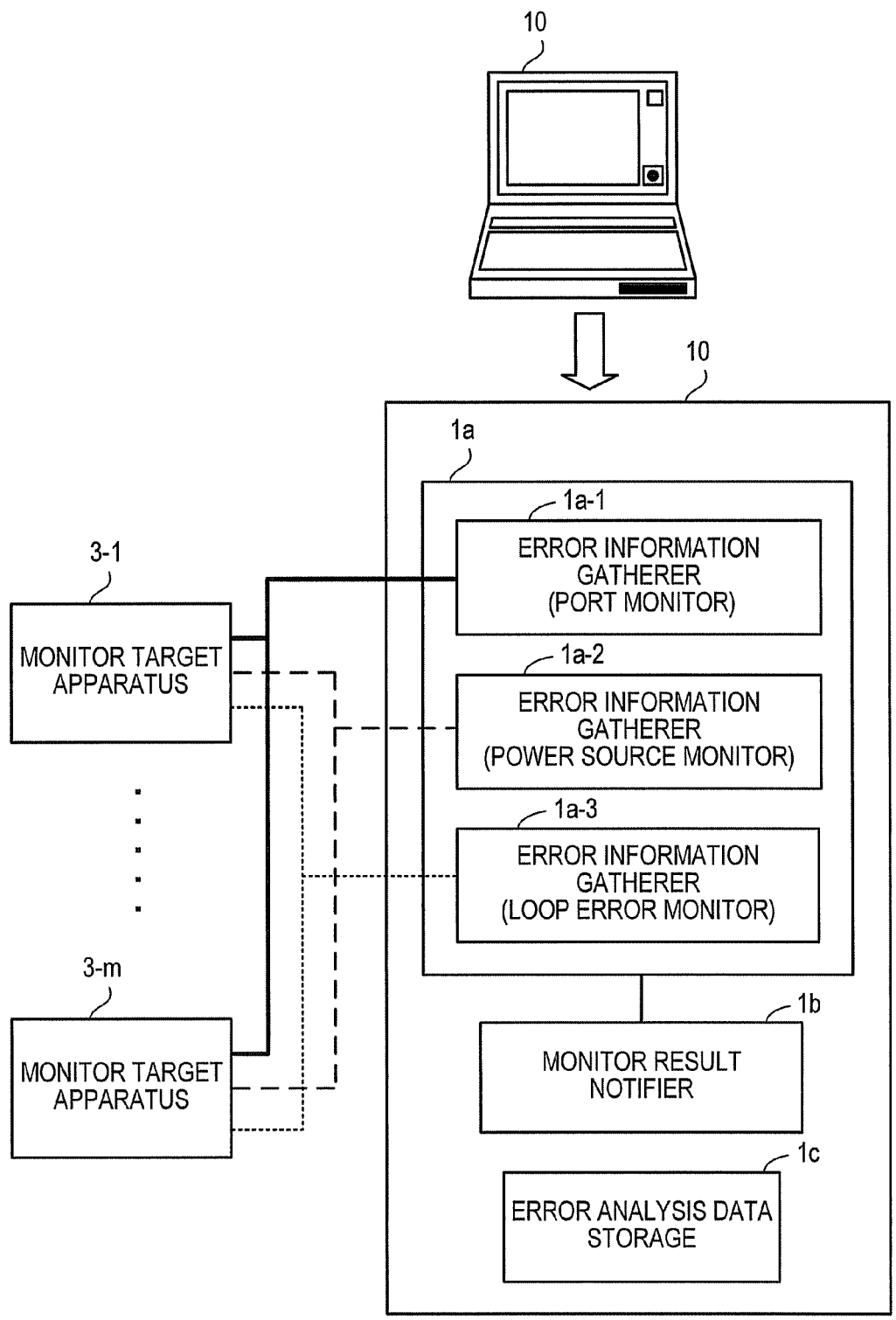
FIG. 1 illustrates a network monitor and control apparatus.

FIG. 1 illustrates a network monitor and control apparatus 10. The network monitor and control apparatus 10 includes an error monitor 1a, a monitor result notifier 1b, and an error analysis storage 1c. The network monitor and control apparatus 10 monitors and controls monitor target apparatuses 3-1 through 3-m.

A network (not shown) such as a relay network may be arranged between the network monitor and control apparatus 10 and the monitor target apparatuses 3-1 through 3-m. The network monitor and control apparatus 10 is thus connected to each of the monitor target apparatuses 3-1 through 3-m via the network. The error monitor 1a, including error information gatherers gathering error information of the monitor target apparatuses 3-1 through 3-m, gathers and analyzes the error information. The monitor result notifier 1b notifies a maintenance person of monitor results. The error analysis storage 1c stores a variety of data used to gather and analyze the error information.

If N types of monitor target functions (N=1, 2, 3, . . . ) are employed, the error monitor 1a includes N error information gatherers gathering the error information of each function. The N error information gatherers gather the error information on a per function basis from existing or newly added monitor target apparatuses.

Referring to FIG. 1, the error monitor 1a includes port monitoring unit 1a-1, power source monitoring unit 1a-2, and loop error monitoring unit 1a-3. The port monitoring unit 1a-1 monitors physical interfaces of the monitor target apparatuses 3-1 through 3-m. The power source monitoring unit 1a-2 monitors power sources of the monitor target apparatuses 3-1 through 3-m. The loop error monitoring unit 1a-3 monitors a loop error of the monitor target apparatuses 3-1 through 3-m.

The port monitoring unit 1a-1 monitors a port. The port monitoring unit 1a-1 thus monitors the ports of the monitor target apparatuses 3-1 through 3-m, and gathers the error information from the monitor target apparatuses 3-1 through 3-m in a port monitoring process.

The power source monitoring unit 1a-2 monitors a power source. The power source monitoring unit 1a-2 thus monitors the power sources of the monitor target apparatuses 3-1 through 3-m. The power source monitoring unit 1a-2 gathers from the monitor target apparatuses 3-1 through 3-m the error information obtained through a power source monitoring process.

The loop error monitoring unit 1a-3 monitors a loop error. The loop error monitoring unit 1a-3 monitors a loop error of the monitor target apparatuses 3-1 through 3-m. The loop error monitoring unit 1a-3 thus gathers from the monitor target apparatuses 3-1 through 3-m the error information in a loop error monitoring process.

network monitor and control apparatus 10 includes the error monitor 1a for gathering the error information on a per function basis in a manner such that apparatuses of different types are monitored on the same monitor target function.

Even if a monitor target apparatus of a different type is added, it is not necessary that a new functional unit for gathering the error information of the newly added monitor target apparatus be arranged. The existing error information gatherers can gather the error information of the monitor target apparatus of the different type.

For example, a monitor target apparatus may now newly added. A new error monitor function of the newly added apparatus is not necessary. The existing port monitoring unit, power source monitoring unit, and loop error monitoring unit are used to gather the error information of the monitor target function from the fresh monitor target apparatus.

The network monitor and control process in response to the addition of the monitor target apparatus is performed in a shorter period of time in comparison with conventional network monitoring technique. The development cost of the apparatus is reduced, and the error monitoring efficiency is improved.

Figure 2:
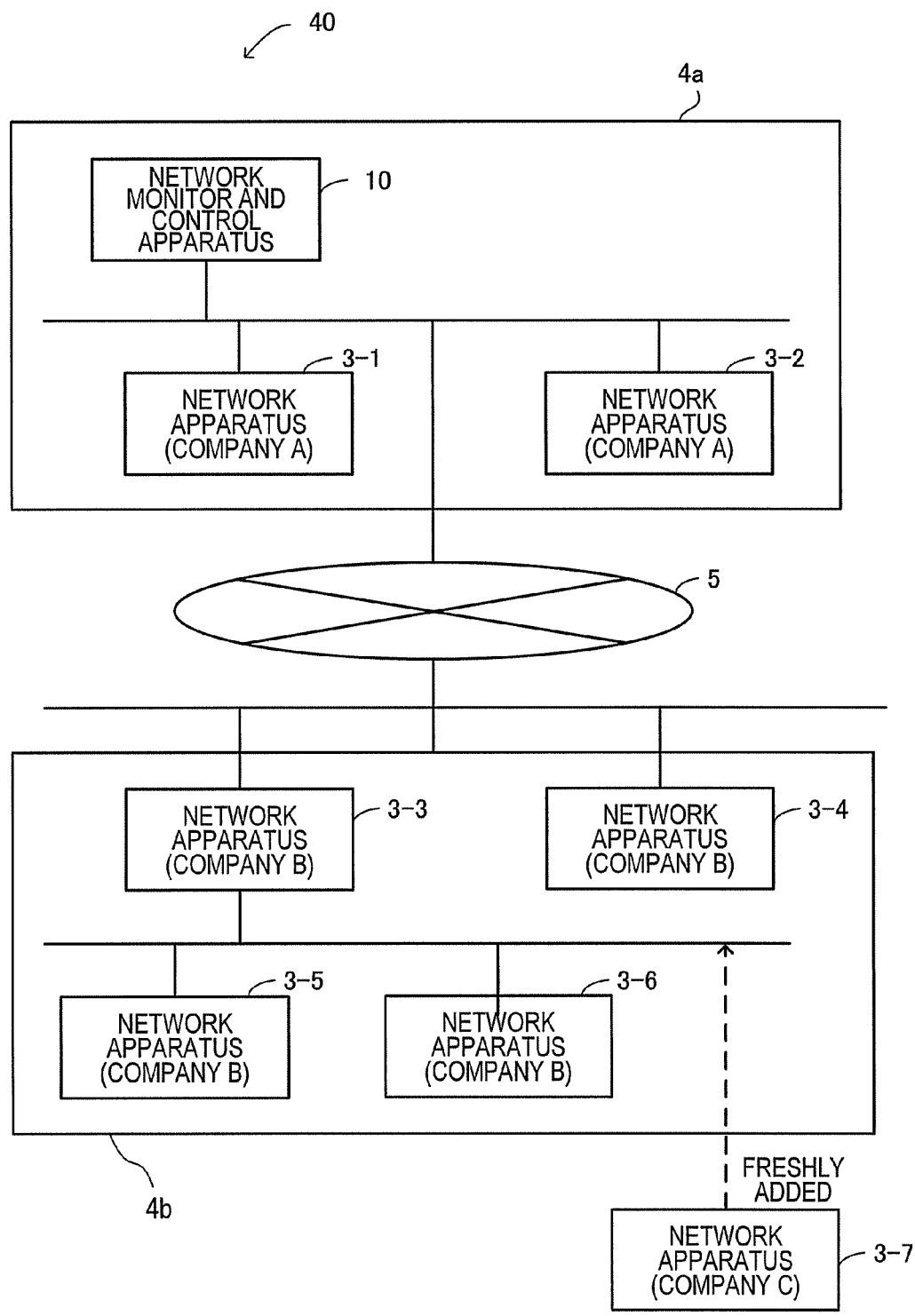
FIG. 2 illustrates a network.

The entire structure of a network 40 including the network monitor and control apparatus 10 is described below. FIG. 2 illustrates the network 40. The network 40 includes monitor center 4a, data center 4b, and relay network 5. The monitor center 4a is connected to the data center 4b via the relay network 5.

The monitor center 4a includes the network monitor and control apparatus 10, and network apparatuses 3-1 and 3-2 (company A), mutually connected to each other via a bus. The data center 4b includes network apparatuses 3-3 through 3-6 (company B) mutually connected via a bus.

The network monitor and control apparatus 10 may be organized as a server as an SNMP manager and a client having a monitor function. Referring to FIG. 2, the functions of the server and the client are included in a single network monitor and control apparatus 10. Alternatively, the server and the client may be implemented as separate apparatuses.

The network apparatuses 3-1 through 3-6 as monitor target apparatuses are SNMP agents and may be a router, an L2 switch, an L3 switch, a server, or a terminal. In the SNMP, a monitor side is referred to as a manager (corresponding to the network monitor and control apparatus 10), and a monitor target side is referred to as an agent (corresponding to the network apparatus).

In the error monitoring process, the network apparatuses 3-1 through 3-6 may notify of an error in one operation or may acquire periodically a status from the network monitor and control apparatus 10 in another operation.

The network apparatuses 3-1 through 3-6 notify of the error in the one operation. When an error is detected in one of the network apparatuses 3-1 through 3-6, the corresponding network apparatus notifies the network monitor and control apparatus 10 of a trap notification.

Upon receiving the trap notification, the network monitor and control apparatus 10 analyzes the error content of the trap, displays analysis results on the monitor thereof, and thus informs a maintenance person of the error content or an error location of the monitor target.

The network apparatuses 3-1 through 3-6 acquire periodically the status from the network monitor and control apparatus 10 in the other operation. The network monitor and control apparatus 10 acquires the MIB information with a predetermined period from a network apparatus as a monitor target (such as the network apparatus 3-3). The network monitor and control apparatus 10 then analyzes the error based on the acquired MIB information, displays analysis results, and then notifies the maintenance person of the error content and the error location of the network apparatus 3-3 as the monitor target.

When a network apparatus (company C) 3-7 is newly connected to a LAN within the data center 4b as illustrated in FIG. 2, the network monitor and control apparatus 10 can quickly analyze the company C for an error.

Figure 3:
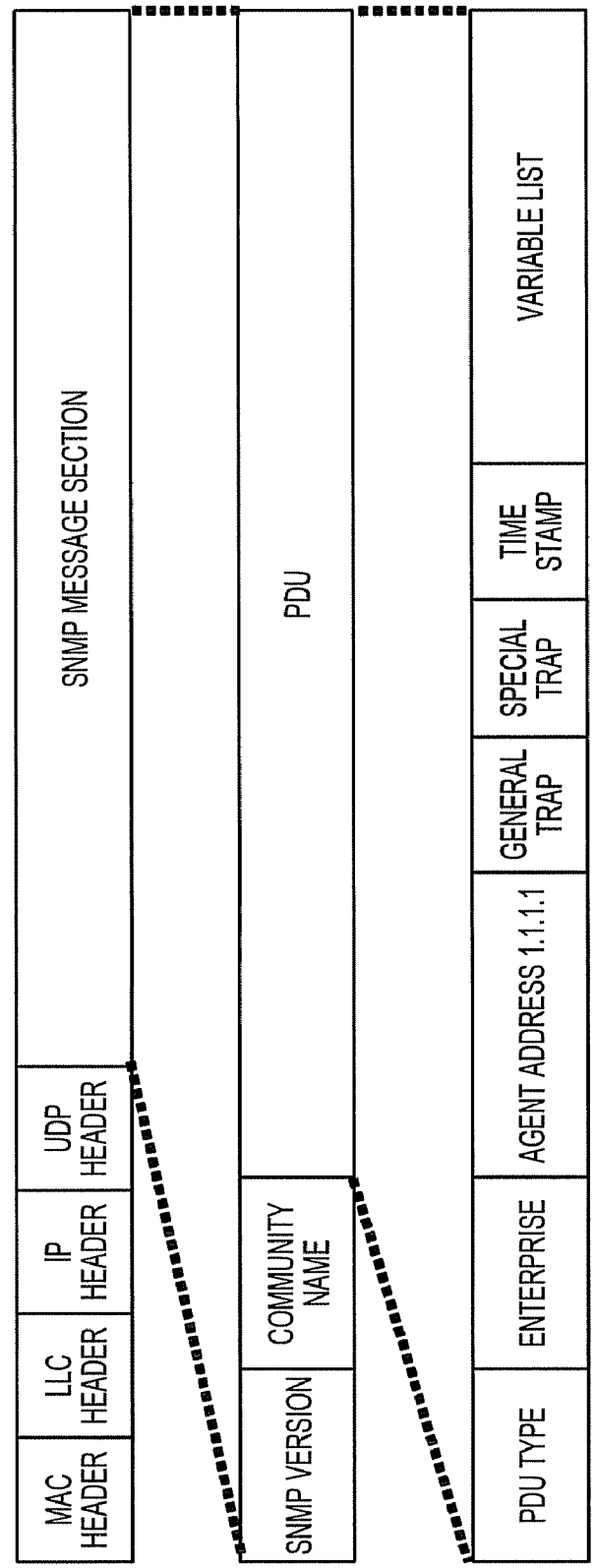
FIG. 3 illustrates a format of a trap notification message.

A frame format of communications performed between the network monitor and control apparatus 10 and a network apparatus is described below. FIG. 3 illustrates a format of a trap notification message. The trap notification message is autonomously transmitted to the network monitor and control apparatus 10 if the network apparatus recognizes a change in the status of own apparatus.

The trap notification message includes fields of a media access control (MAC) header, a logical link control (LLC) header, an Internet protocol (IP) header, a user datagram protocol (UDP) header, and an SNMP message section.

The SNMP message section includes fields of an SNMP version, a community name, and a protocol data unit (PDU). The PDU includes fields of a PDU type, an enterprise, an agent address, a general trap, a special trap, a time stamp, and a variable list.

The agent address is a field in which the IP address of own apparatus is embedded. Referring to FIG. 3, the IP address of the network apparatus is 1.1.1.1. The network monitor and control apparatus 10 recognizes the IP address of the network apparatus as a monitor target based on the value written on the agent address field.

The PDU is a command of SNMP. Using the PDU, the manager requests information from the agent, requests the agent to update information, and notifies the agent of a change in the status of the apparatus.

Figure 4:
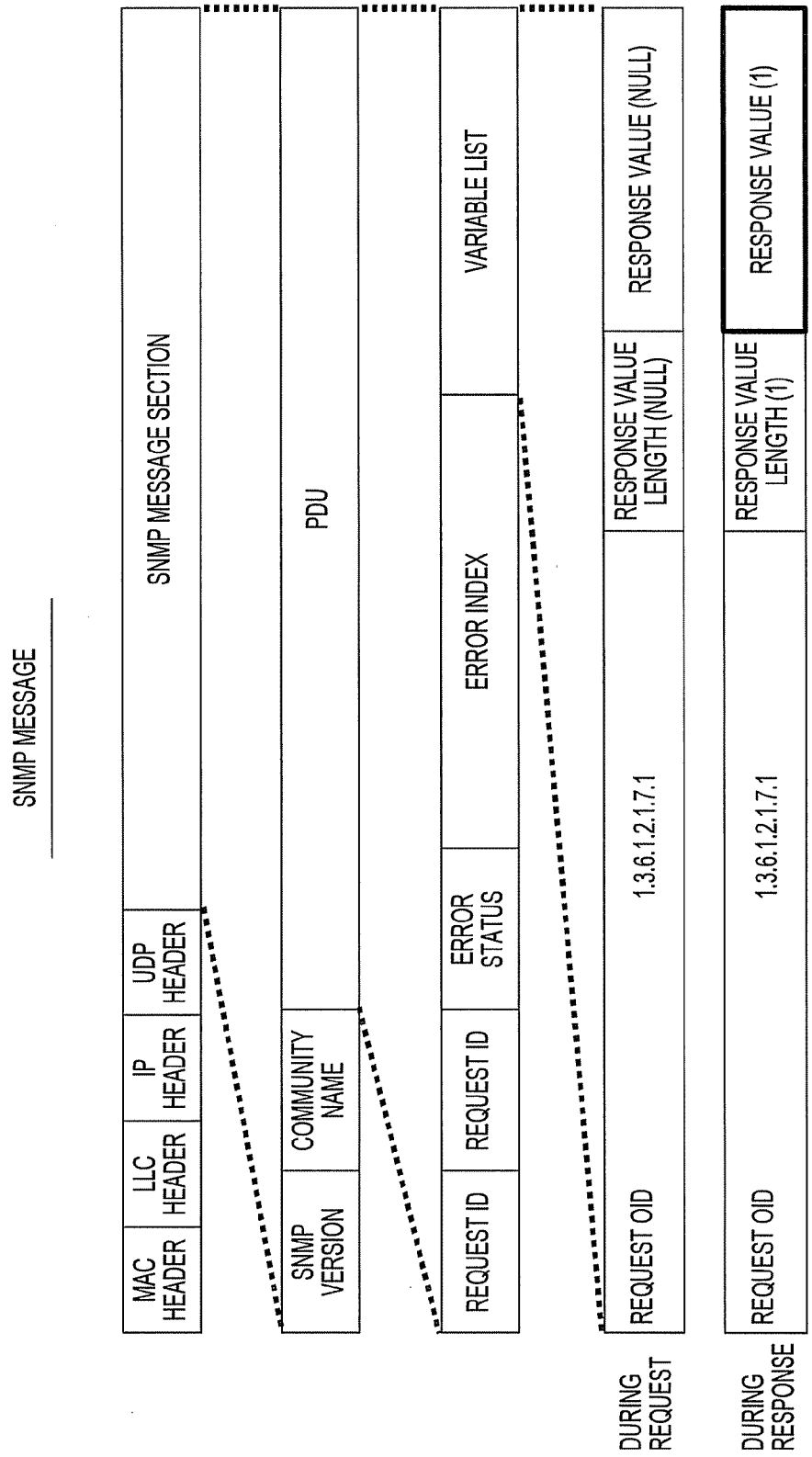
FIG. 4 illustrates a format of a SNMP message.

FIG. 4 illustrates the format of the SNMP message. The SNMP message is a message transmitted from the manager to the agent or from the agent to the manager. The format of the SNMP message includes an MAC header, an LLC header, an IP header, a UDP header, and an SNMP message section.

The SNMP message section includes fields of an SNMP version, a community name, and a PDU. The PDU includes fields of a PDU type, a request ID, an error status, an error index, and a variable list. The variable list includes fields of a request OID, a response value length, and a response value.

When requesting data from the network apparatus, the network monitor and control apparatus 10 produces an SNMP message by embedding the value of OID of the desired information in the field of the request OID in the variable list, and setting the response length value and the response value to null. The network monitor and control apparatus 10 then transmits the SNMP message to the network apparatus. As illustrated in FIG. 4, the network monitor and control apparatus 10 requests information corresponding to OID of 1.3.6.2.1.7.1 from the network apparatus.

When responding to the network monitor and control apparatus 10, the network apparatus produces an SNMP message by embedding a value as a response value of the variable list (for example, a response value of 1 indicates normal), and writing a length of a response value as the response value length. The network monitor and control apparatus then transmits the SNMP message to the network monitor and control apparatus 10.

The structure and operation of the network monitor and control apparatus 10 are described in detail below. FIGS. 5-12 illustrate the structure of the network monitor and control apparatus 10. The network monitor and control apparatus 10 sets up any type of monitor target function and acquires the error information responsive to the monitor target function. In the discussion that follows, the network monitor and control apparatus 10 performs three functions, namely, a port monitoring function, a power source monitoring function, and a loop error monitoring function through STP.

The network monitor and control apparatus 10 includes port monitoring error analyzer 11a (corresponding to the port monitoring unit 1a-1), power source monitoring error analyzer 11b (corresponding to the power source monitoring unit 1a-2), STP monitoring error analyzer 11c (corresponding to the loop error monitoring unit 1a-3), trap receiver 12a, trap analyzer 12b, error manager 13, error detection processor 14, screen operation unit 15, external request receiver 16, apparatus type identifying unit 17, timer manager 18, and overall determination processor 19 (corresponding to an error information selector).

The error monitor 1a illustrated in FIG. 1 includes functions of the port monitoring error analyzer 11a, the power source monitoring error analyzer 11b, the STP monitoring error analyzer 11c, the error manager 13, the error detection processor 14 and the external request receiver 16. The monitor result notifier 1b includes a function of the screen operation unit 15.

The network monitor and control apparatus 10 includes, as tables and database related elements thereof, timer management table 20, node database (DB) 21, related DB 22, function DB 23, port related DB 24, management port DB 25, function definition DB 26, error information DB 27, process information table 28, and apparatus type DB 29. These tables and databases are included in the error analysis storage 1c illustrated in FIG. 1.

Figure 5:
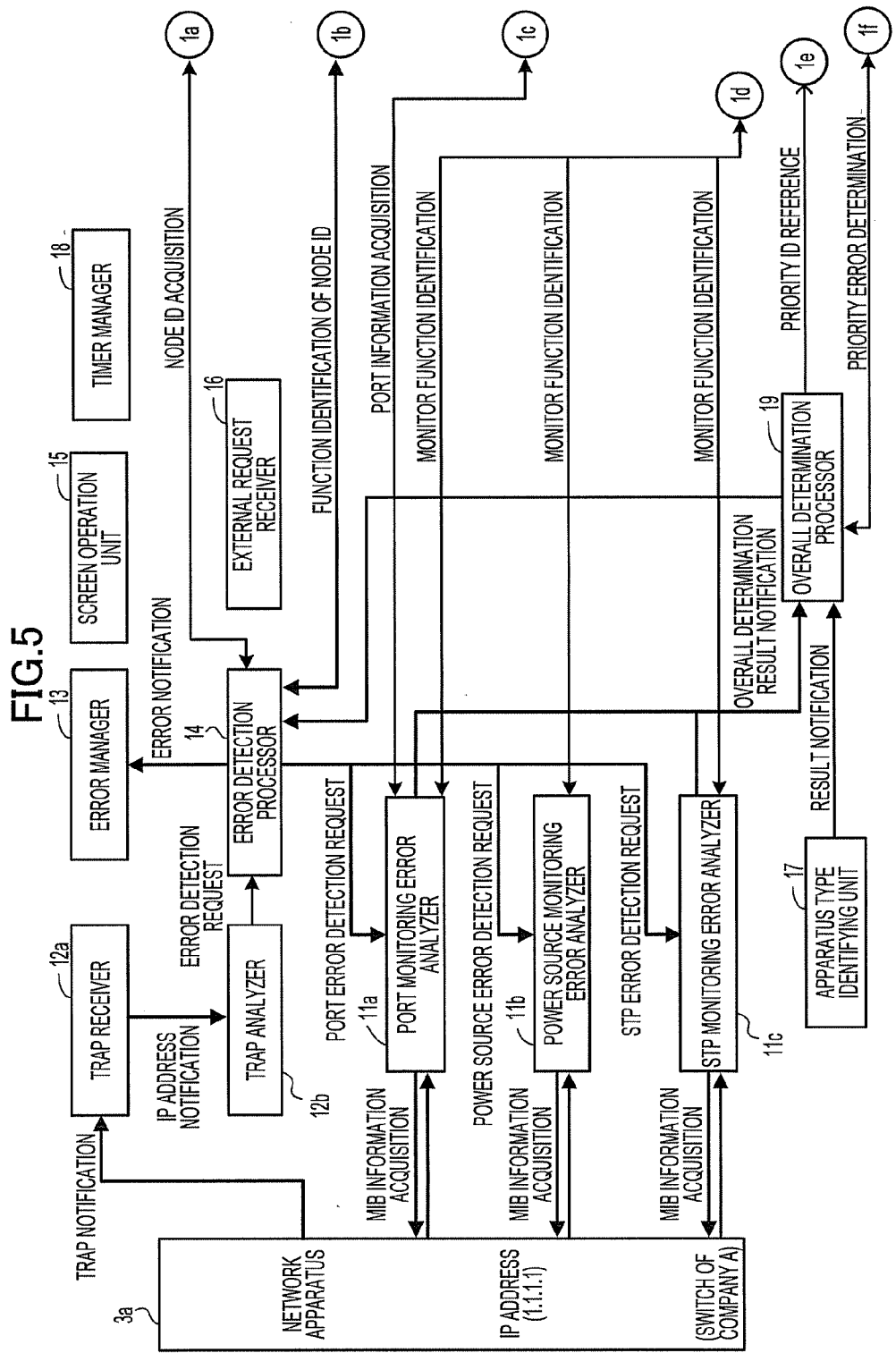
FIG. 5 illustrates a network monitor and control apparatus.

Referring to FIG. 5, the network monitor and control apparatus 10 is connected to the network apparatus 3a (switch of the company A having an IP address 1.1.1.1) for error monitoring. In practice, the network monitor and control apparatus 10 and the network apparatus 3a are connected via a network, but such a network is not shown in FIG. 5.

The operation of each element is briefly described below. The port monitoring error analyzer 11a, the power source monitoring error analyzer 11b, and the STP monitoring error analyzer 11c gather the error information related to the monitor target function thereof. If an error detection request is received from the error detection processor 14 on a per monitor target function basis, the MIB information is gathered from the network apparatus and the gathered results are supplied to the overall determination processor 19.

If an error detection verification request is received from the external request receiver 16, the corresponding OIDs of the network apparatuses of all the apparatus types assigned with the function are gathered using the function definition DB 26.

For example, the port monitoring error analyzer 11a references the function definition DB 26, thereby acquiring the OIDs related to port monitoring from the network apparatuses of all the apparatus types assigned with the port monitoring functions.

The MIB information is gathered from the network apparatuses in the order of registration of acquired OIDs. If MIB information as a normal response to the request is present, the gathering of the MIB information from the network apparatus is complete. The OID corresponding to the MIB information as a normal response is added as an OID of the apparatus on the function definition DB 26. The network monitor and control apparatus 10 then notifies the external receiver 16 of error detection verification results.

The trap receiver 12a receives a trap transmitted from the network apparatus. The error manager 13 receives an error notification from the error detection processor 14 on a per network apparatus basis, and manages the error (i.e., stores the error notification and notifies a user of the error).

The screen operation unit 15, having a user interface function, displays error monitoring results to a maintenance person on the screen, and sets information input by a user. If the trap of which the network apparatus has notified is missing, the user manually operates the screen operation unit 15 to input a gathering instruction to gather the status information of the network apparatus. In response to the gathering instruction, the screen operation unit 15 notifies the error detection processor 14 of a status gathering request for gathering an operational status of the network apparatus.

When a fresh network apparatus is registered by the user, the screen operation unit 15 writes onto the node DB 21 the IP address input by the user, and notifies the external request receiver 16 of the IP address.

When the external request receiver 16 notifies the screen operation unit 15 of node registration results (a registration failure), the screen operation unit 15 displays an error message to the user, and deletes from the node DB 21 the IP address registered as a fresh apparatus.

The external request receiver 16 notifies the apparatus type identifying unit 17 of an apparatus type determination request (IP address of the registered network apparatus) in order to identify the network apparatus in response to the IP address which the screen operation unit 15 has notified of. The external request receiver 16 receives an apparatus type determination result notification from the apparatus type identifying unit 17.

Upon receiving the apparatus type determination request (registered IP address) from the external request receiver 16, the apparatus type identifying unit 17 determines the apparatus type of the network apparatus, and notifies the external request receiver 16 of the determination results.

On the premise that the trap which the network apparatus is to notify of is missing, the timer manager 18 automatically notifies the error detection processor 14 of a status gathering request with a timer period.

The trap analyzer 12b identifies the network apparatus having notified of the trap, based on the trap from the trap receiver 12a, and notifies the error detection processor 14 of an error detection request.

The error detection processor 14 also may perform the following:

1) The error detection processor 14 receives trap information from the trap analyzer 12b.

2) The error detection processor 14 extracts a node ID of the network apparatus from the node DB 21 based on the received trap information.

3) The error detection processor 14 extracts the error gathering function for the network apparatus (such as port monitoring, power source monitoring, and STP monitoring) from the related DB 22 with "ID(1)" of the node ID served as a key.

4) The error detection processor 14 notifies the corresponding one of the port monitoring error analyzer 11a, the power source monitoring error analyzer 11b, and the STP monitoring error analyzer 11c of the error detection request of the extracted error gathering (such as port monitoring, power source monitoring, or STP monitoring).

5) The detected error information is transmitted to the overall determination processor 19. The error detection processor 14 receives determination results from the overall determination processor 19 and then notifies the error manager 13 of the determination results. The detected error information is not directly transmitted to the error detection processor 14. The overall determination processor 19 selects the error information of an error having a higher priority and then notifies the error detection processor 14 of the selected result. This operation will be described further later.

The overall determination processor 19 stores on the process information table 28 the error information which each of the port monitoring error analyzer 11a, the power source monitoring error analyzer 11b, and the STP monitoring error analyzer 11c has notified of. After the results of all the functions which the analyzers have notified of are stored, the overall determination processor 19 performs an overall determination process.

In the overall determination process, the overall determination processor 19 acquires a function ID stored on the process information table 28, and acquires a priority function ID of the function ID by referencing the function definition DB 26 according to the acquired function ID. The error detection processor 14 is notified of the error content indicated by the priority function ID.

The tables and databases are described with reference to FIGS. 6-12. A timer management table 20 illustrated in FIG. 6 stores present time, an IP address, previous time, and a time value. The node DB 21 illustrated in FIG. 7 stores the IP address of the network apparatus, and the node ID (ID of each apparatus).

Figure 8:
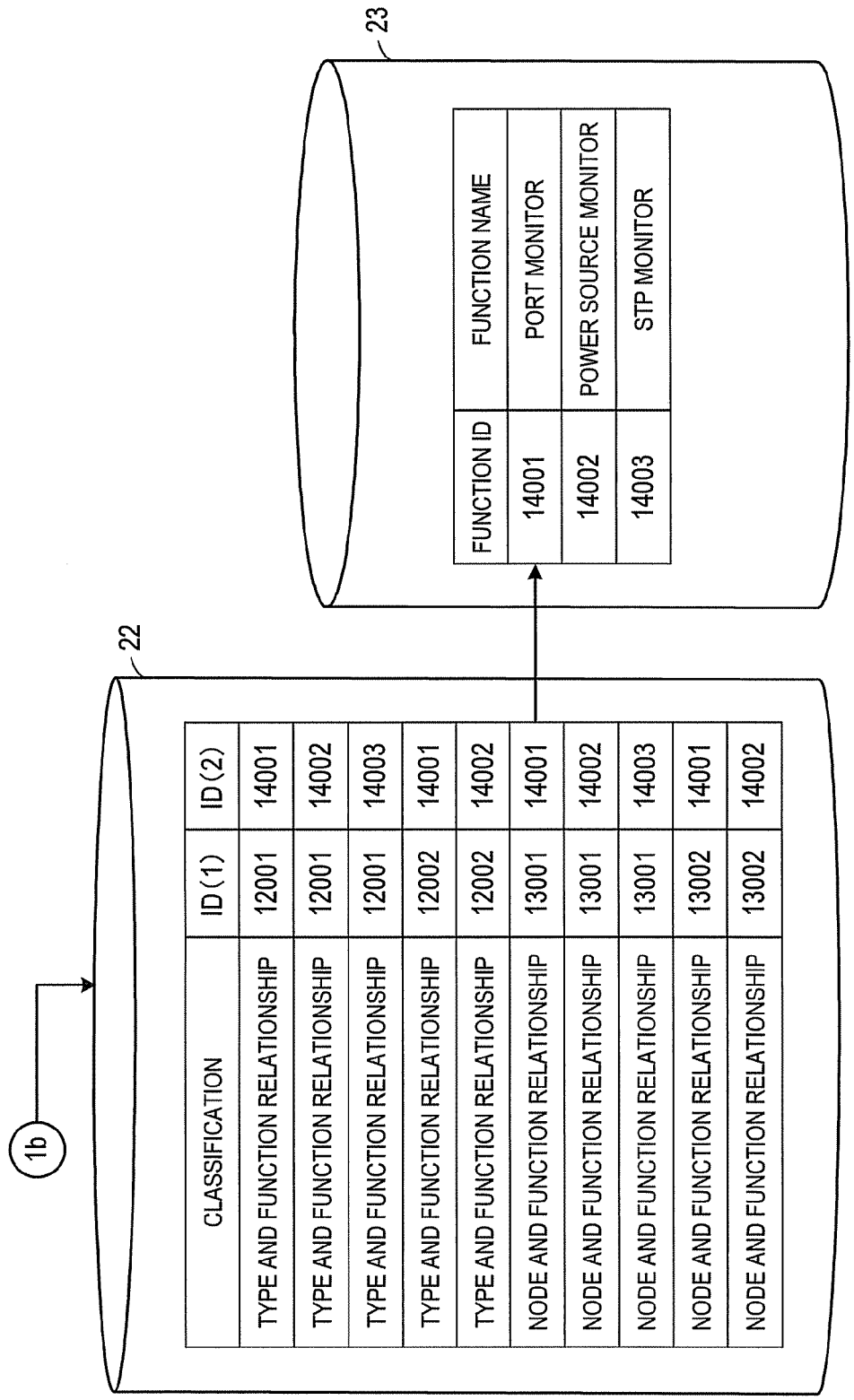
FIG. 8 illustrates an exemplary network monitor and control apparatus.

Referring to FIG. 8, the related DB 22 stores the mapping relationship between the apparatus type of a network apparatus and a monitoring function ID, and the mapping relationship between a node ID and the monitoring function ID. The function DB 23 stores the relationship between a port ID and a port name.

Figure 9:
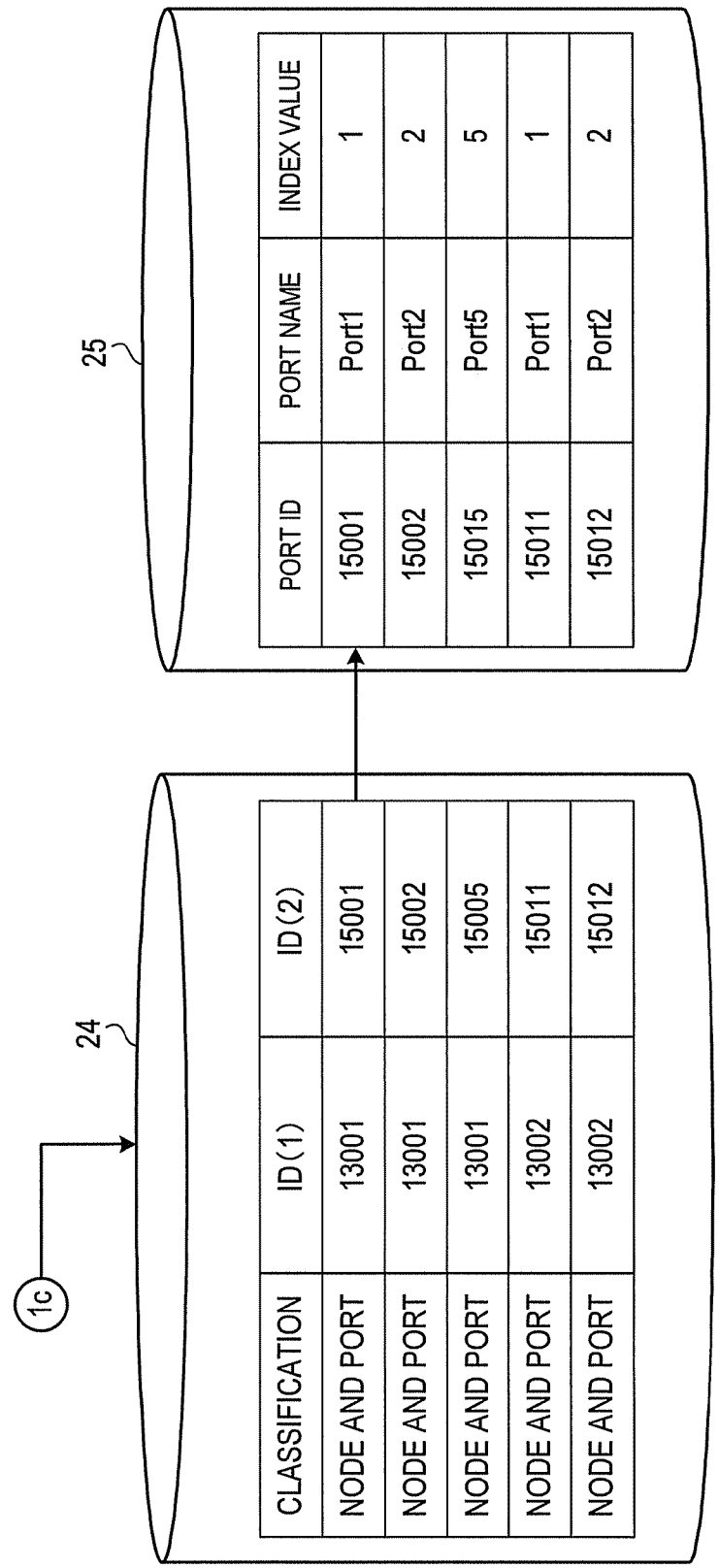
FIG. 9 illustrates an exemplary network monitor and control apparatus.

Referring to FIG. 9, the port related DB 24 stores the mapping relationship between a node and a monitor target port ID of the node, and the management port DB 25 stores the mapping relationship between a port ID and a port name.

Figure 10:
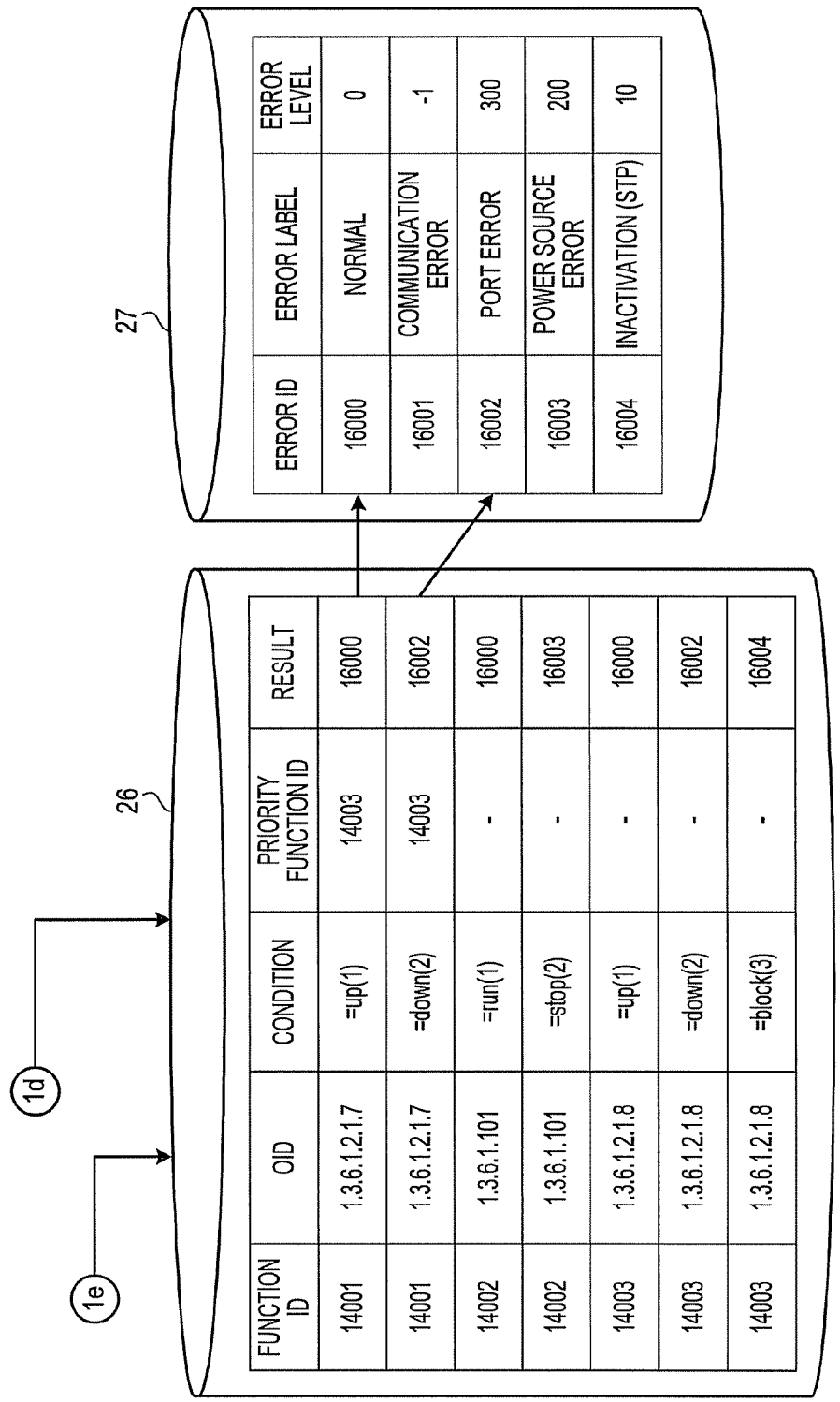
FIG. 10 illustrates an exemplary network monitor and control apparatus.

Referring to FIG. 10, the function definition DB 26 stores the mapping relationship of an OID for gathering the monitor function ID and the MIB information, a condition for determining the read MIB information, a priority function ID, and an ID representing an error result. The error information DB 27 stores the mapping relationship of the ID of the error result, an error label (name of the error), and an error level.

Figure 11:
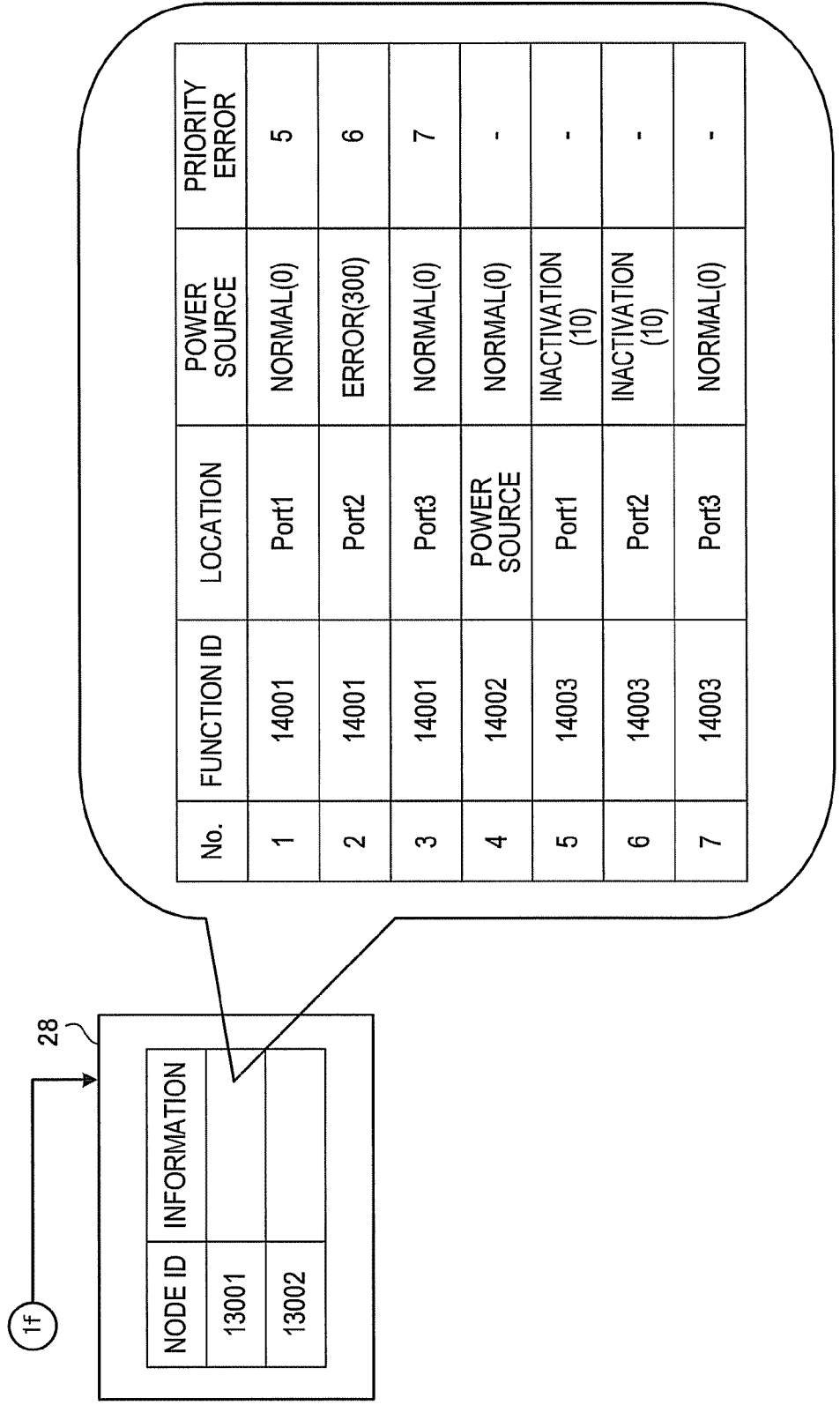
FIG. 11 illustrates an exemplary network monitor and control apparatus.
Figure 13:
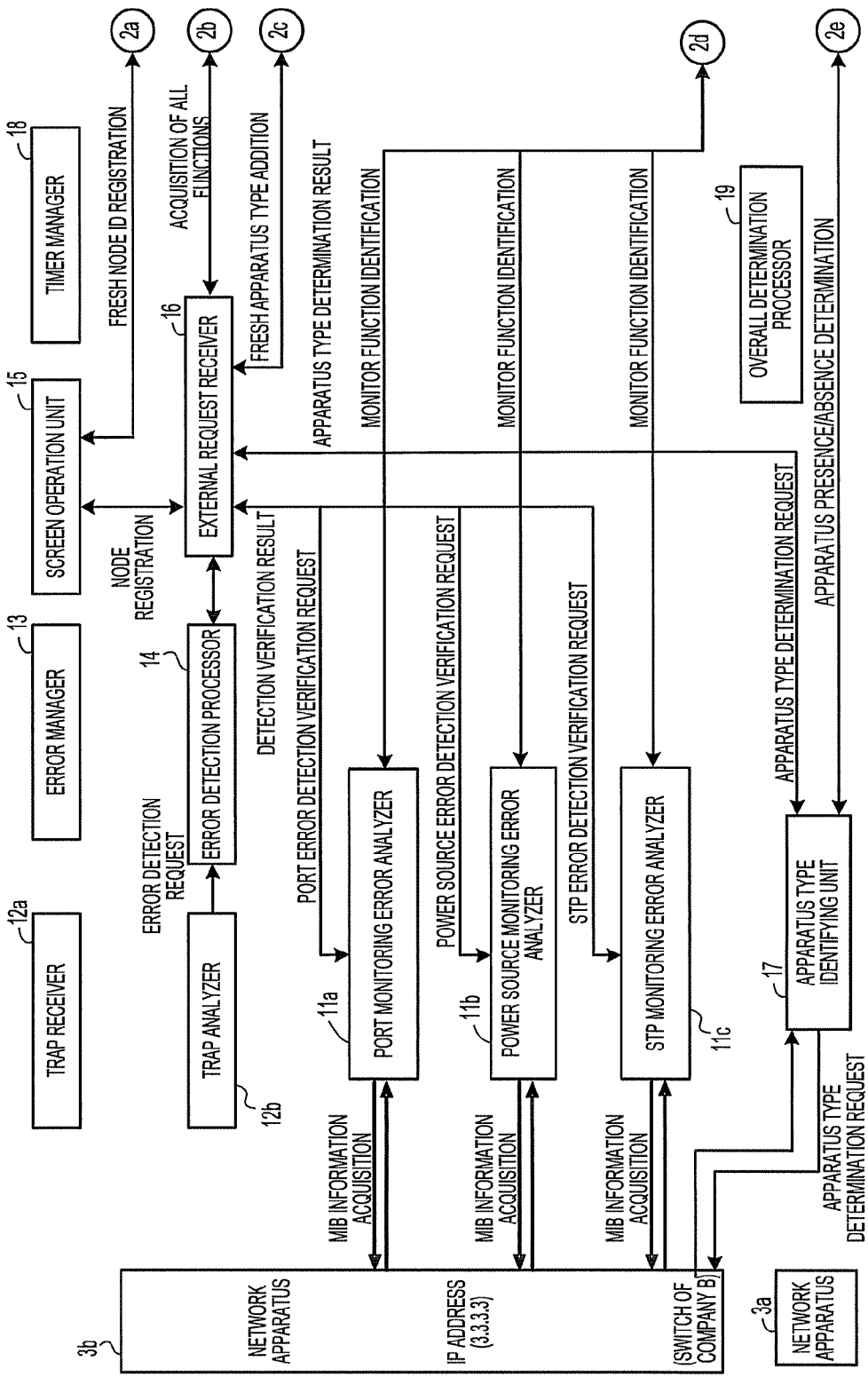
FIG. 13 illustrates an operation of an exemplary network monitor and control apparatus when a network apparatus is newly installed.

The process information table 28 of FIG. 11 lists a node ID item and an information item. The information item includes a registration number, a function ID, a location, results, and a priority error. An apparatus type DB 29 of FIG. 12 stores the mapping relationship of an apparatus type ID of a network apparatus, SysOID, and an apparatus type name. SysOID is an apparatus type identifier identifying the apparatus type of a fresh monitor target apparatus.

In response to the trap notification, the network monitor and control apparatus 10 monitors the network apparatus 3a. The network monitor and control apparatus 10 in this case operates as described below. If an error takes place on the network apparatus 3a (the switch of the company A having an IP address of 1.1.1.1), the network apparatus 3a notifies the network monitor and control apparatus 10 of a status change through a trap.

The trap receiver 12a in the network monitor and control apparatus 10 receives the trap, and transfers the received trap to the trap analyzer 12b. The trap analyzer 12b extracts the IP address (1.1.1.1) of the network apparatus 3a from the agent address of the trap notification message.

The trap analyzer 12b notifies the error detection processor 14 of the extracted IP address (1.1.1.1). The error detection processor 14 searches the node DB 21 in response to the notified IP address (1.1.1.1) to extract a node ID (13001) of the network apparatus 3a.

The error detection processor 14 searches for and extracts the value of ID(2) responsive to 13001 of ID(1) of the related DB 22 (ID(2) corresponding to a monitor target function identifier). Referring to FIG. 8, three IDs of 14001, 14002, and 14003 are extracted.

The monitoring functions of function ID14001 (port monitoring), function ID14002 (power source monitoring), and function ID14003 (STP monitoring) are identified from the function DB 23 in response to the extracted ID. More specifically, the port monitoring, the power source monitoring, and the STP monitoring, as the error monitoring operations, are performed on the network apparatus 3a having the node ID (13001).

With the related DB 22 managing the apparatus type and the monitor target function in a mapped state, the addition of a fresh monitor target function, and the suspension of the monitor target function having become unnecessary are easily controlled on a per apparatus basis during the gathering of the error information.

In response to the identified monitor function, the error detection processor 14 transmits the node ID(13001) to the three analyzers 11a, 11b, and 11c. The error detection processor 14 also transmits to the three analyzers the respective error detection request.

The node ID(13001) is transmitted to the port monitoring error analyzer 11a, the power source monitoring error analyzer 11b, and the STP monitoring error analyzer 11c. Furthermore, a port error detection request is transmitted to the port monitoring error analyzer 11a, a power source error detection request is transmitted to the power source monitoring error analyzer 11b, and an STP error detection request is transmitted to the STP monitoring error analyzer 11c.

The port monitoring, the power source monitoring, and the STP monitoring are identical in basic operation of the error monitoring to each other. The explanation of the error monitoring focuses on the port monitoring.

Upon receiving the port error detection request, the port monitoring error analyzer 11a searches the function definition DB 26 and extracts OID(1.3.6.1.2.1.7) in response to own apparatus function ID 14001 (14001 being ID representing the port monitoring). The OID of the function definition DB 26 is an error information identifier.

Using the function definition DB 26, the port monitoring error analyzer 11a can recognize that the information related to the port status, out of the MIB information held by the network apparatus 3a, is managed by OID (1.3.6.1.2.1.7).

The network monitor and control apparatus 10 with the function definition DB 26 included therewithin manages the OID managed by each monitor target apparatus with the monitor target function mapped to the OID. For example, different types of apparatuses such as of the company A and the company B are different in OID of the MIB information for detecting a port error.

In contrast, the network monitor and control apparatus 10 collectively manages the OIDs of the apparatuses of different types using the function definition DB 26. The network monitor and control apparatus 10 can thus easily determine an OID to which a given network apparatus assigns the MIB information for port monitoring.

The port monitoring error analyzer 11a searches the node DB 21 and then extracts the IP address (1.1.1.1) from the node ID (13001). The port monitoring error analyzer 11a further searches the port related DB 24 and extracts the port IDs 15001, 15002, and 15005 registered on the node ID (13001) (ID(1) is a node ID, and ID(2) is a port ID).

The port monitoring error analyzer 11a extracts from the management port DB 25 a port name (Port1) and an index value (1) responsive to the port ID(15001), a port name (Port2) and an index value (2) responsive to the port ID(15002), and a port name (Port5) and an index value (5) responsive to the port ID(15005).

The port monitoring error analyzer 11a notifies the apparatus having the IP address (1.1.1.1) of the information of OID(1.3.6.1.2.7.1) through an SNMP message. (The port monitoring error analyzer 11a writes 1.3.6.1.2.7.1 on the request OID field of FIG. 4 and then transmits the request OID.)

The network apparatus 3a notifies the port monitoring error analyzer 11a of a response value (1) through the SNMP message (the response value (1) for a normal operation, and the response value (2) for a faulty operation). Upon receiving the SNMP message, the port monitoring error analyzer 11a extracts the response value (1) from the SNMP message.

Since the response value is 1, the port monitoring error analyzer 11a searches the function definition DB 26 for a record "1" from the "condition" item responsive to own apparatus function ID (14001). Since the condition item on the top record is up(1) in this case, the top record is the record "1." (Up of up(1) indicates that a cable is correctly connected to the corresponding port). From the top record, 16000 is extracted from the "result" item.

An error level "0" is extracted from the error information DB 27 with an error ID(16000) serving as a key. The port monitoring error analyzer 11a notifies the overall determination processor 19 of the function ID(14001), the location (Port1), and the error level (0) as the gathering results.

As for the value of the error level, "0" is normal. In the case of a negative value, the lower the negative value, the more serious the error is. In the case of a positive value, the higher the positive value, the higher the frequency of occurrence of the error becomes.

The network apparatus 3a may now notify the port monitoring error analyzer 11a of the response value (2) through the SNMP message. The port monitoring error analyzer 11a having received the SNMP message extracts the response value (2) from the SNMP message.

The port monitoring error analyzer 11a searches the "condition" item on the function definition DB 26 for the response value (2) of the record responsive to own apparatus function ID(14001), and extracts the record of down (2) (down of down(2) indicates that the cable is disconnected from the corresponding port). The port monitoring error analyzer 11a extracts (16002) from the "result" item of the record.

The port monitoring error analyzer 11a extracts an error level (300) from the error information DB 27 with the error ID(16002) as a key. The port monitoring error analyzer 11a notifies the overall determination processor 19 of the function ID(14001), the location (Port1), and the error level (300) as the gathering results.

The port monitoring error analyzer 11a produces the SNMP messages for the number of own node IDs (ID(1)) registered on the port related DB 24, requests the error information from the apparatus having the IP address "1.1.1.1" through the SNMP messages, and notifies the overall determination processor 19 of the error information.

Referring to FIG. 9, the port related DB 24 lists three IDs(1)=13001, and the ID(2) item lists 15001, 15002, and 15003. In the management port DB 25, the port ID=15001 is port name (Port1), the port ID=15002 is port name (Port2), and the port ID=15005 is port name (Port5). The network apparatus 3a port monitors these three ports in error monitoring.

The overall determination processor 19 stores on the process information table 28 the error information which each of the port monitoring error analyzer 11a, the power source monitoring error analyzer 11b, and the STP monitoring error analyzer 11c has notified of, and then performs the overall determination process.

The overall determination processor 19 acquires the function ID from the process information table 28, and then acquires the priority function ID of the function ID by referencing the function definition DB 26 in response to the acquired function ID.

The overall determination processor 19 searches the process information table 28 for the same function ID as the acquired priority function ID, and detects a registration number (No.) responsive to the same function ID as the priority function ID, and writes the registration number on the "priority error" item.

For example, the overall determination processor 19 may now acquire the function ID(14001). The overall determination processor 19 searches the function definition DB 26 and acquires the priority function ID(14003) of the function ID(14001). The overall determination processor 19 searches the process information table 28 for the same function ID as the acquired priority function ID(14003), and then extracts the corresponding No. Here, the corresponding numbers are "5," "6," and "7."

The overall determination processor 19 then lists the hit numbers ("5," "6," and "7") on the cells for the "priority errors" of the function ID(14001) on the process information table 28. If the priority function ID is not registered for the function ID on the function definition DB 26, the cell of the "priority error" is left blank.

The overall determination processor 19 references the process information table 28. If no value is registered on a cell for the "priority error," the overall determination processor 19 sets directly the error content stored on the process information table 28 to be the error at the corresponding location.

For example, in the process information table 28, the "priority error" cells of No. 4 function ID(14002) and No. 5 through No. 7 function IDs(14003) are left blank. As for the function IDs for Nos. 4-7, the content listed at the "result" item is transferred as is.

If a priority function ID is registered, the error information responsive to No. written on the "priority error" stored on the process information table 28 is referenced. If the referenced error information indicates any error, the overall determination processor 19 notifies of the error information of the corresponding location as the error content of the priority function ID destination.

For example, No. 1 of the process information table 28 lists "5" as the "priority error." In place of the error content of No. 1, information listed on No. 5 row, namely, the function ID(14003), the location (Port1), and the result (inactivation (10)) has a higher priority. The error information on No. 5 is set to be the error content of the corresponding location.

As described above, the port monitoring function (function ID(14001)) and the STP monitoring function (function ID(14003)) are compared with each other in terms of priority error. The result of the STP monitoring function is reported with a higher priority than the result of the port monitoring function. If an inactivation occurs due to STP even with the port in normal operating condition, the error content with the STP prioritized is reported to the user. An excellent monitoring operation is thus performed.

The results determined by the overall determination processor 19 (including normal and faulty conditions) are reported to the error detection processor 14, and the error detection processor 14 notifies the error manager 13 of the error information.

The error determination results from each error analyzer are different in this way and are thus stored on the process information table 28. The priority error information is thus identified. The most serious error is handled with a higher priority placed thereon. By modifying the priority, the detection of the most serious error is set to any error on a per apparatus type basis.

The error status may be acquired in response to an operation of the maintenance person or periodically with a timer. If the error status is acquired in response to the operation of the maintenance person, the maintenance person performing the monitoring operation on the network apparatus may issue a request to acquire a present status of the network apparatus.

The screen operation unit 15 requests the error detection processor 14 to output a request to acquire status in response to the information of the IP address designated on the screen of the network monitor and control apparatus 10. The subsequent process is identical to the process discussed above.

If the error status is acquired periodically with the timer, the error monitoring operation is performed periodically in accordance with a timer value set on each network apparatus. The timer manager 18 calculates a difference between time at which the previous monitoring operation managed at the PI address of each network apparatus on the timer management table 20 (see FIG. 6) and the present time.

If the timer value is in excess, the timer manager 18 notifies the error detection processor 14 of the status acquisition request in accordance with the IP address, and updates the previous time with the present time on the timer management table 20.

Figure 6:
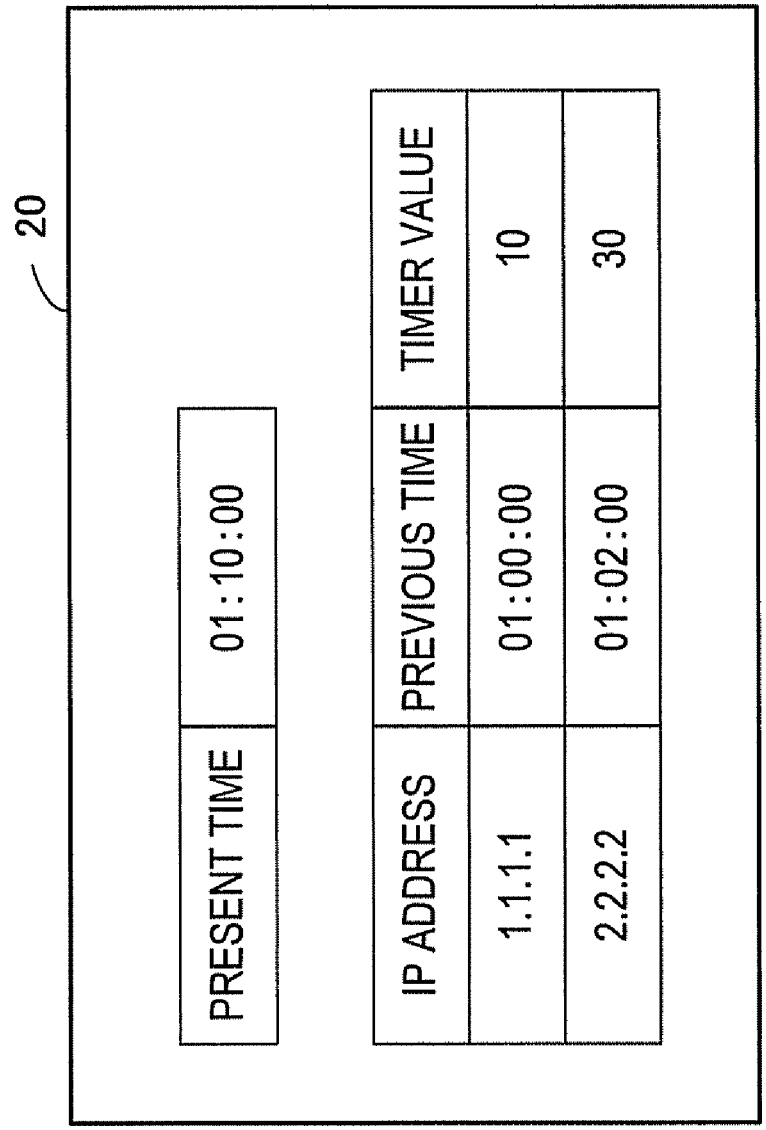
FIG. 6 illustrates an exemplary network monitor and control apparatus.
Figure 7:
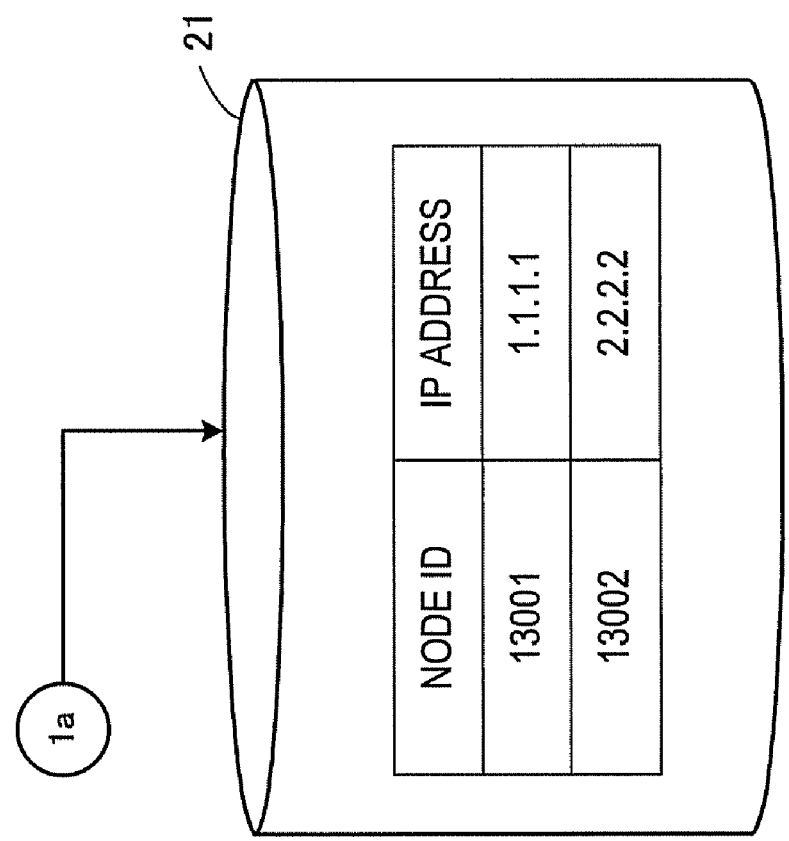
FIG. 7 illustrates an exemplary network monitor and control apparatus.

In the timer management table 20 illustrated in FIG. 6, the previous error monitoring time to the network apparatus having an IP address of 1.1.1.1 was 01:00:00, the timer value is 10 (the error monitoring operation is performed every 10 minutes), and the present time is 01:10:00.

At time 01:10:00, the timer manager 18 notifies the error detection processor 14 of the status acquisition request for the network apparatus having the IP address of 1.1.1.1. The subsequent process is identical to the previously discussed process.

An automatic error monitoring operation performed when a network apparatus is newly introduced is described below. FIGS. 13-17 illustrate the operation of the network monitor and control apparatus 10 in response to the fresh introduction of a network apparatus. The basic structure and operation of the network monitor and control apparatus 10 have been described, and only a difference from those described above is described below.

Figure 14:
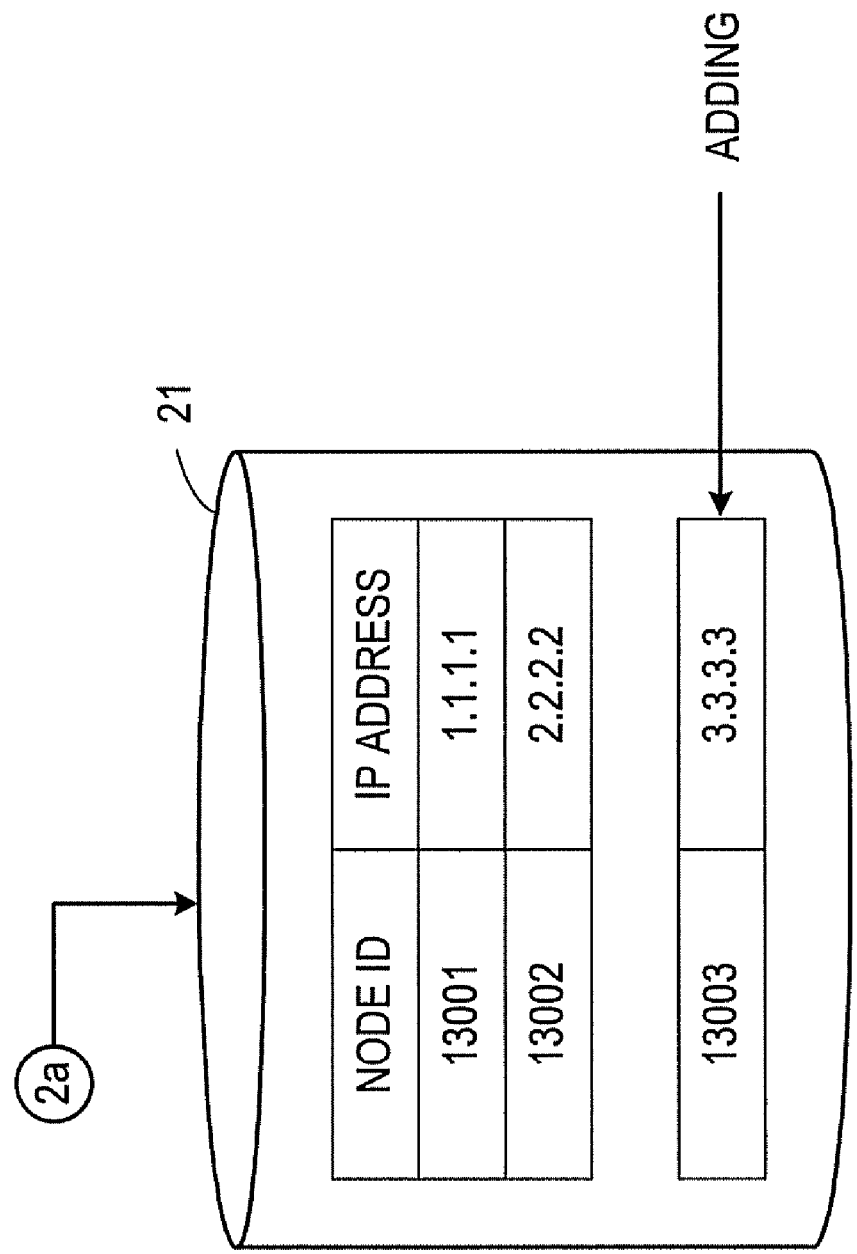
FIG. 14 illustrates an operation of an exemplary network monitor and control apparatus when an exemplary network apparatus is newly installed.

A network apparatus 3b (switch of the company B having an IP address of 3.3.3.3) may be newly added. The screen operation unit 15 adds the IP address 3.3.3.3 of the network apparatus 3b on the node DB 21 (FIG. 14).

A new node ID for the network apparatus 3b is set and inserted. Referring to FIG. 14, the node ID of the network apparatus 3b is 13003, and the node DB 21 stores the node ID (13003) and the IP address (3.3.3.3) in a mapped state. When the node ID is registered on the node DB 21, the screen operation unit 15 issues a node registration request to the external request receiver 16.

An apparatus type determination process is then performed on the newly introduced network apparatus. The external request receiver 16 then notifies the apparatus type identifying unit 17 of an apparatus type determination request containing information concerning the registered IP address. The apparatus type identifying unit 17 acquires from the network apparatus 3b having the IP address (3.3.3.3) the MIB information (SysOID) for identifying the apparatus type (SysOID of the network apparatus 3b is 1.3.6.103).

Upon receiving the SysOID (1.3.6.103) as the apparatus type determination result, the external request receiver 16 searches an apparatus type DB 23b with SysOID (1.3.6.103)

as a key to determine whether the apparatus type has already been recognized, and then notifies the external request receiver 16 of the determination results.

Figure 17:
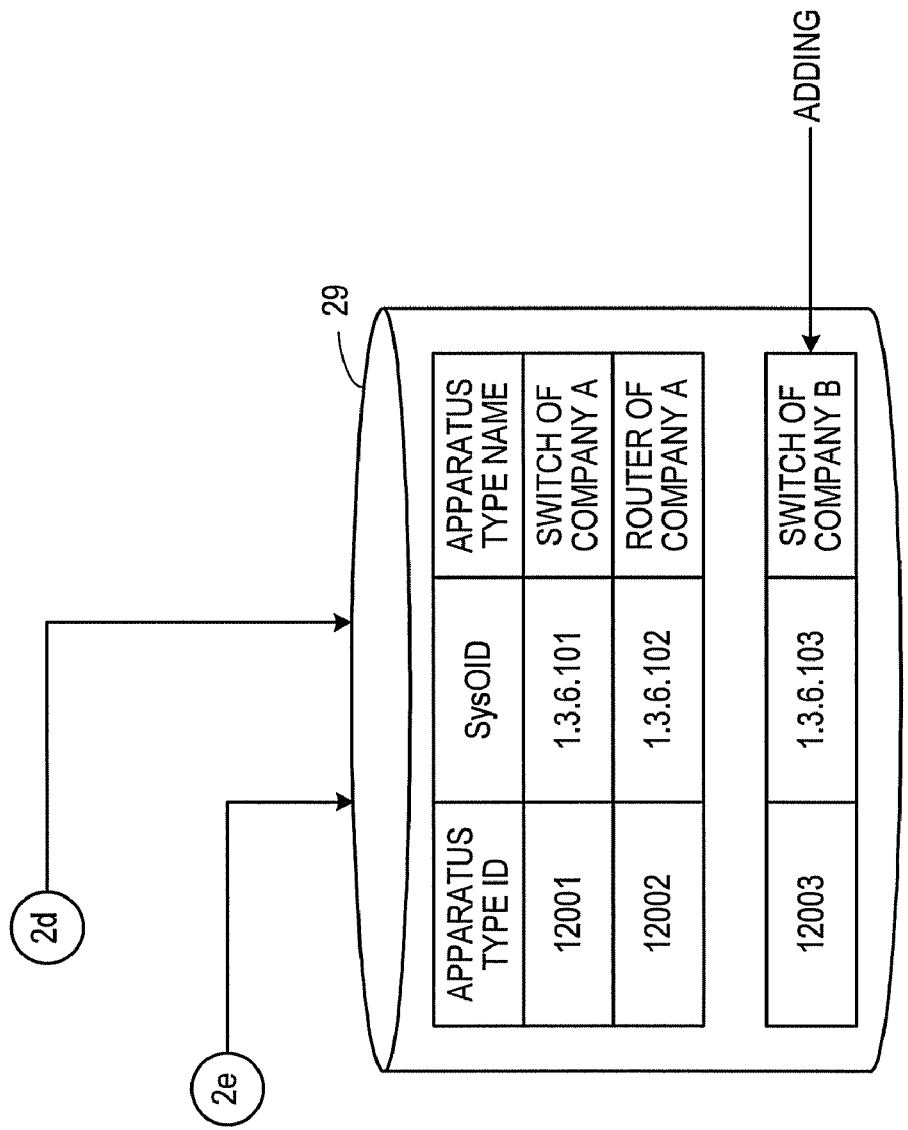
FIG. 17 illustrates an operation of an exemplary network monitor and control apparatus when the network apparatus is newly installed.

If the fresh addition determination result indicates no apparatus type on an apparatus type DB 29, the external request receiver 16 additionally adds on the apparatus type DB 29 the acquired SysOID (1.3.6.103), the newly inserted apparatus type ID (12003), and the apparatus type (Switch of the company B) in a mapped state (FIG. 17).

The external request receiver 16 recognizes whether one of the port monitoring, the power source monitoring and the STP monitoring is possible to the network apparatus 3b. To this end, the external request receiver 16 outputs a port error detection verification request to the port monitoring error analyzer 11a, a power source error detection verification request to the power source monitoring error analyzer 11b, and an STP error detection verification request to the STP monitoring error analyzer 11c.

Upon receiving the port error detection verification request, the port monitoring error analyzer 11a acquires the port related MIB information. Similarly, the power source monitoring error analyzer 11b acquires the MIB information related to the power source from the network apparatus 3b in response to the reception of the power source error detection verification request. The STP monitoring error analyzer 11c acquires the MIB information related to the STP from the network apparatus 3b in response to the reception of the STP error detection verification request.

Figure 16:
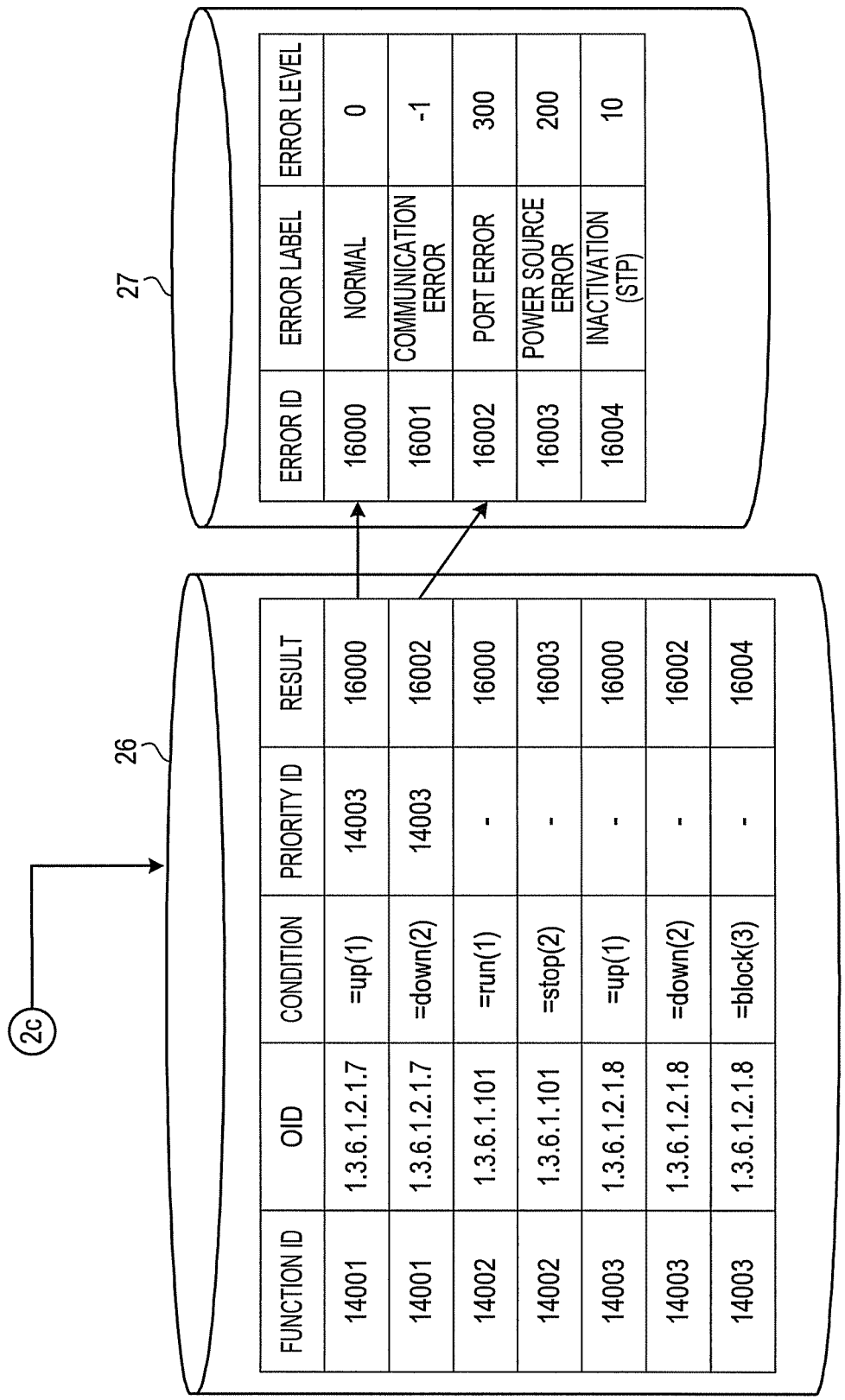
FIG. 16 illustrates an operation of an exemplary network monitor and control apparatus when the network apparatus is newly installed.

In the acquisition of the MIB information, the port monitoring error analyzer 11a, the power source monitoring error analyzer 11b, and the STP monitoring error analyzer 11c respectively acquire OIDs for monitor targets from the function definition DB 26 and the error information DB 27 (FIG. 16).

Figure 15:
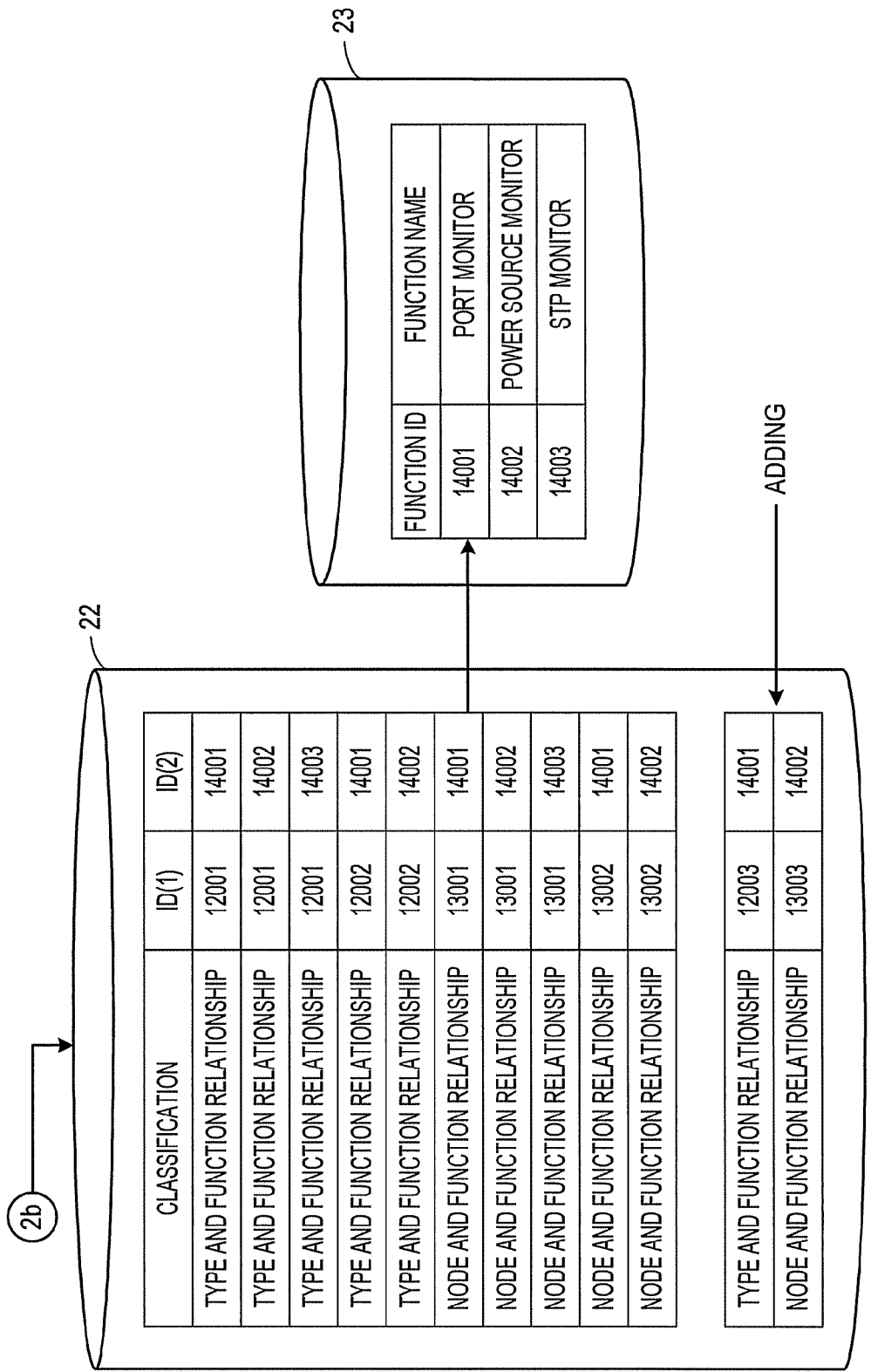
FIG. 15 illustrates an operation of an exemplary network monitor and control apparatus when the network apparatus is newly installed.

In response to the acquisition of the MIB information, the port monitoring error analyzer 11a, the power source monitoring error analyzer 11b, and the STP monitoring error analyzer 11c thus provide the monitor enabled/disabled determination results thereof to the external request receiver 16. On the basis of the monitor-enabled function ID, the external request receiver 16 adds on the related DB 22 information indicating the relationship between the apparatus type and the function, and the relationship between the node and the function (FIG. 15).

If the error detection verification is successful, the external request receiver 16 notifies the screen operation unit 15 of a node registration result (success), and then notifies the error detection processor 14 of an error detection request. If the error detection verification fails, the external request receiver 16 notifies the screen operation unit 15 of a node registration (failure).

The apparatus type identifying unit 17 acquires SysOID as the MIB information identifying the apparatus type from the fresh network apparatus, and then determines from the apparatus type DB 29 whether the apparatus type has already been monitored.

In the case of the fresh apparatus type, the external request receiver 16 adds SysOID onto the apparatus type DB 29. The external request receiver 16 further adds on the related DB 22 the monitor target function about which an error analyzer having monitored have gathered the MIB information.

At the start of monitoring of the newly added network apparatus, the network monitor and control apparatus is automatically assigned an error analysis function on a per function basis. Even if the MIB information of the existing network apparatus is modified, the network monitor and control apparatus can quickly comply with the modification.

If it is determined that the network apparatus 3b exists, the external request receiver 16 acquires the apparatus type ID, searches the classification item of "relationship between the type and the function" on the related DB 22 for the same apparatus type ID "ID(1)" and extracts the error monitoring function "ID(2)." The external request receiver 16 then registers on the related DB 22 the apparatus type ID "ID(1)" and the extracted error monitoring function "ID(2)." The external request receiver 16 then notifies the error detection processor 14 of an error detection request.

[The network monitor and control apparatus 10 gathers the error information on a per function basis so that even a different apparatus type can be monitored given the same monitoring function.

A network apparatus may be added, deleted, or replaced, and the network configuration may also be modified. In particular, fresh network apparatuses may be frequently added, and the function of an existing network apparatus may be frequently extended.

Under these circumstances, conventional network monitoring technique is unable to work with a newly added monitor target apparatus without adding or modifying an error analysis function of the network monitor and control apparatus each time the monitor target apparatus is newly added. Conventional network monitoring technique fails to achieve an efficient error monitoring.

In contrast, the above-described network monitor and control apparatus 10 gathers the error information on a per function basis rather than gathering the error information of the monitor target on a per apparatus basis. For example, the network monitor and control apparatus 10 performs the port monitoring for monitoring a physical interface of the apparatus, the power source monitoring for monitoring a power source of the apparatus, and the loop monitoring for monitoring a loop error of the apparatus. The network monitor and control apparatus 10 can thus monitor an error of the network apparatus in a short period of time, and increase an error monitoring efficiency in the network monitor control process.

According to an exemplary embodiment, port monitoring, power source monitoring, and STP monitoring are performed. According to an exemplary embodiment, a network monitor and control apparatus can monitor s another function.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A network monitor and control apparatus for controlling the monitoring of a network, comprising:
   an error monitor including an error information gatherer using a processor for gathering error information of a monitor target apparatus; and
   a monitor result notifier for notifying of monitor results,
   wherein if there are N types of monitor target functions, the error monitor includes N error information gatherers for the respective N types of monitor target functions, wherein N is a positive integer, and wherein each of the N error information gatherers gathers the error information from one of an existing monitor target apparatus and a newly added monitor target apparatus on a per monitor target function basis, and
   wherein if a fresh monitor target apparatus is added, an apparatus type identifying unit acquires from the fresh monitor target apparatus an apparatus type identifier for identifying the apparatus type of the fresh monitor target apparatus, and determines whether the fresh monitor target apparatus has been registered as an apparatus type and as a monitor target.

2. The network monitor and control apparatus according to claim 1, wherein the error information gatherer attempts to gather from the fresh monitor target apparatus the error information on a per function basis and
   wherein if the error information is gatherable on a per function basis, the error information gatherer automatically stores on a related database the apparatus type identifier of the fresh monitor target apparatus and a monitor target function identifier of the monitor target function of the gatherable error information, the related database mapping the apparatus type identifier of the monitor target apparatus to the monitor target function identifier of the monitor target function to manage the apparatus type identifier and the monitor target function identifier.

* * * * *